(12) United States Patent
Watanabe

(10) Patent No.: US 10,215,188 B2
(45) Date of Patent: Feb. 26, 2019

(54) BLOWER

(71) Applicant: DENSO CORPORATION, Kariya, Aichi-pref. (JP)

(72) Inventor: Chie Watanabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 417 days.

(21) Appl. No.: 14/911,069

(22) PCT Filed: Aug. 8, 2014

(86) PCT No.: PCT/JP2014/004152
§ 371 (c)(1),
(2) Date: Feb. 9, 2016

(87) PCT Pub. No.: WO2015/025498
PCT Pub. Date: Feb. 26, 2015

(65) Prior Publication Data
US 2016/0177970 A1 Jun. 23, 2016

(30) Foreign Application Priority Data
Aug. 20, 2013 (JP) .................................. 2013-170394

(51) Int. Cl.
*F04D 29/42* (2006.01)
*F04D 29/70* (2006.01)
(Continued)

(52) U.S. Cl.
CPC ......... *F04D 29/4233* (2013.01); *F04D 17/16* (2013.01); *F04D 25/02* (2013.01);
(Continued)

(58) Field of Classification Search
CPC ...... F04D 29/4233; F04D 17/16; F04D 25/02; F04D 29/281; F04D 29/4226;
(Continued)

(56) References Cited

U.S. PATENT DOCUMENTS 7,210,903 B2 * 5/2007 Lyons .................. F04D 29/422
415/204
8,075,262 B2 * 12/2011 Watanabe ........... F04D 29/4233
415/119
(Continued)

FOREIGN PATENT DOCUMENTS

JP    H10023700 A    1/1998
JP    2000033812 A   2/2000
(Continued)

OTHER PUBLICATIONS

Machine Translation of JP 2007154856 [retrieved on May 2, 2018]. Retrieved from: Espacenet.*
(Continued)

*Primary Examiner* — Logan Kraft
*Assistant Examiner* — Eric Zamora Alvarez
(74) *Attorney, Agent, or Firm* — Harness, Dickey & Pierce, P.L.C.

(57) ABSTRACT

A motor casing is provided with a motor rib which is annularly formed along a circumferential direction of a fan while protruding toward a main shroud, and the motor rib is provided with a notch portion in a portion near a high-pressure region in a scroll chamber. A part of moisture flowing into the scroll chamber infiltrates into an inner peripheral space of the motor rib across the motor rib in a low-pressure region in which a flow velocity of ventilation air is high in the scroll chamber. However, the moisture is pressed to the notch portion by ventilation air infiltrating into the inner peripheral space of the motor rib from the low-pressure region in the scroll chamber, and is then discharged to the scroll chamber from the notch portion.

7 Claims, 4 Drawing Sheets

(51) Int. Cl.
*F04D 29/28* (2006.01)
*F04D 29/44* (2006.01)
*F04D 17/16* (2006.01)
*F04D 25/02* (2006.01)
*H02K 5/10* (2006.01)

(52) U.S. Cl.
CPC ....... *F04D 29/281* (2013.01); *F04D 29/4226* (2013.01); *F04D 29/441* (2013.01); *F04D 29/703* (2013.01); *F04D 29/706* (2013.01); *H02K 5/10* (2013.01); *F05D 2260/602* (2013.01); *H02K 2205/09* (2013.01)

(58) Field of Classification Search
CPC .... F04D 29/441; F04D 29/703; F04D 29/706; F04D 29/162; F04D 29/263; H02K 5/10; H02K 2205/09; F05D 2260/602
See application file for complete search history.

(56) References Cited

U.S. PATENT DOCUMENTS

| | | | | |
|---|---|---|---|---|
| 9,624,943 | B2* | 4/2017 | Jones | .................. F04D 29/667 |
| 9,869,321 | B2* | 1/2018 | Ishihara | .............. F04D 25/0686 |
| 2002/0025253 | A1 | 2/2002 | Ozeki et al. | |
| 2011/0033287 | A1* | 2/2011 | Lindner | ............. B60H 1/00471 415/204 |
| 2013/0323040 | A1* | 12/2013 | Fujita | .................. F04D 29/4226 415/200 |
| 2013/0336819 | A1* | 12/2013 | Kobayashi | .......... F04D 29/4226 417/410.1 |

FOREIGN PATENT DOCUMENTS

| | | |
|---|---|---|
| JP | 2000110791 A | 4/2000 |
| JP | 2002048097 A | 2/2002 |
| JP | 2002161890 A | 6/2002 |
| JP | 2004068741 A | 3/2004 |
| JP | 2007154856 A | 6/2007 |
| WO | WO-2015004836 A1 | 1/2015 |

OTHER PUBLICATIONS

International Search Report and Written Opinion (in Japanese with English Translation) for PCT/JP2014/004152, dated Oct. 14, 2014; ISA/JP.

* cited by examiner

BLOWER

CROSS REFERENCE TO RELATED APPLICATIONS

This application is a U.S. National Phase Application under 35 U.S.C. 371 of International Application No. PCT/JP2014/004152 filed on Aug. 8, 2014 and published in Japanese as WO 2015/025498 A1 on Feb. 26, 2015. This application is based on and claims the benefit of priority from Japanese Patent Application No. 2013-170394 filed on Aug. 20, 2013. The entire disclosures of all of the above applications are incorporated herein by reference.

FIELD OF THE INVENTION

The present disclosure relates to a blower in which a fan for generating an air flow is driven by a motor.

BACKGROUND ART

For example, Patent Documents 1 and 2 disclose a blower used for a conventional vehicle air conditioner.

The blower disclosed in Patent Documents 1 and 2 includes a fan which has a plurality of blades connected by a main shroud, a motor for driving the fan, a scroll casing which has a spiral scroll chamber formed around the fan while accommodating the fan, and a motor casing arranged to face the main shroud while accommodating the motor.

In addition, the main shroud is formed with an annular fan rib protruding toward the motor casing, and the motor casing is formed with an annular motor rib protruding toward the main shroud. Thereby, air flowing through the scroll chamber is suppressed from flowing backward, i.e. flowing upstream of the scroll chamber through a gap between the main shroud and the motor casing.

Furthermore, a portion of ventilation air blown to a vehicle interior is motor-cooling air and is introduced into the motor to cool the motor, and the motor-cooling air after passing through the inside of the motor is returned to the scroll chamber through the gap between the main shroud and the motor casing.

The motor rib has a notch portion formed on a portion near a low-pressure region in the scroll chamber such that inner peripheral and outer peripheral spaces of the motor rib communicate with each other through the notch portion. Thereby, the motor-cooling air is returned to the low-pressure region in the scroll chamber through the notch portion. Here, all terminologies related to pressure used in the present disclosure (e.g., "lower pressure" and "high pressure") refer to a static pressure.

CITATION LIST

Patent Document

Patent Document 1
Japanese Unexamined Patent Application Publication No. 2002-48097
Patent Document 1
Japanese Unexamined Patent Application Publication No. 2002-161890

SUMMARY OF INVENTION

According to the examination of the present inventors, moisture such as rainwater and evaporator detergent tends to flow into the blower, together with ventilation air. For example, the ventilation air and a portion of the moisture flow into the scroll chamber, and then infiltrate into the inner peripheral space of the motor rib across the motor rib or through the notch portion formed at the motor rib.

In addition, ventilation air and moisture tend to infiltrate into the inner peripheral space of the rib in the low-pressure region in which the flow velocity of ventilation air is high in the scroll chamber. Accordingly, when the notch portion is formed in the low-pressure region in the scroll chamber as in the conventional blower, ventilation air and moisture easily infiltrate into the inner peripheral space of the motor rib through the notch portion from the scroll chamber. On the other hand, it is difficult for the moisture infiltrating into the inner peripheral space of the motor rib to be discharged to the scroll chamber through the notch portion.

When the moisture infiltrating into the inner peripheral space of the motor rib is not discharged to the scroll chamber, the moisture infiltrates into a portion of the motor casing, in which the motor is accommodated. As a result, the components of the motor may be corroded due to the infiltrated moisture.

The present disclosure has been made in view of the above matters, and an object thereof is to provide a blower in which moisture infiltrating into an inner peripheral space of a motor rib is easily discharged to a scroll chamber.

To achieve the above object, a blower according to an exemplar embodiment of the present disclosure includes: a motor; a fan having a plurality of blades arranged around a rotary shaft of the motor, and a main shroud transferring rotational driving force generated by the motor to the blades while connecting the blades, the fan drawing air from one side in an axial direction so that the air is blown radially outward from the fan; a scroll casing having a spiral scroll chamber formed around the fan while accommodating the fan; and a motor casing accommodating the motor, and arranged to face the main shroud. The main shroud includes a fan rib, disposed at a surface facing the motor casing and protruding toward the motor casing while being annularly formed along a circumferential direction of the fan, and the motor casing includes a motor rib, disposed at a surface facing the main shroud and protruding toward the main shroud while being annularly formed along a circumferential direction of the fan. The motor rib includes a notch portion, through which an inner peripheral space and an outer peripheral space of the motor rib communicate with each other, at a portion approaching a high-pressure region in the scroll chamber.

According to the present disclosure, because the notch portion of the motor rib is arranged in a portion approaching a high-pressure region in which the flow velocity of ventilation air is low in a scroll chamber, moisture infiltrating into the inner peripheral space of the motor rib is pressed to the notch portion by ventilation air, flowing into the inner peripheral space of the motor rib from a low-pressure region in which the flow velocity of ventilation air is high in the scroll chamber, so as to be effectively discharged to the scroll chamber from the notch portion.

DESCRIPTION OF EMBODIMENTS

Figure 1:
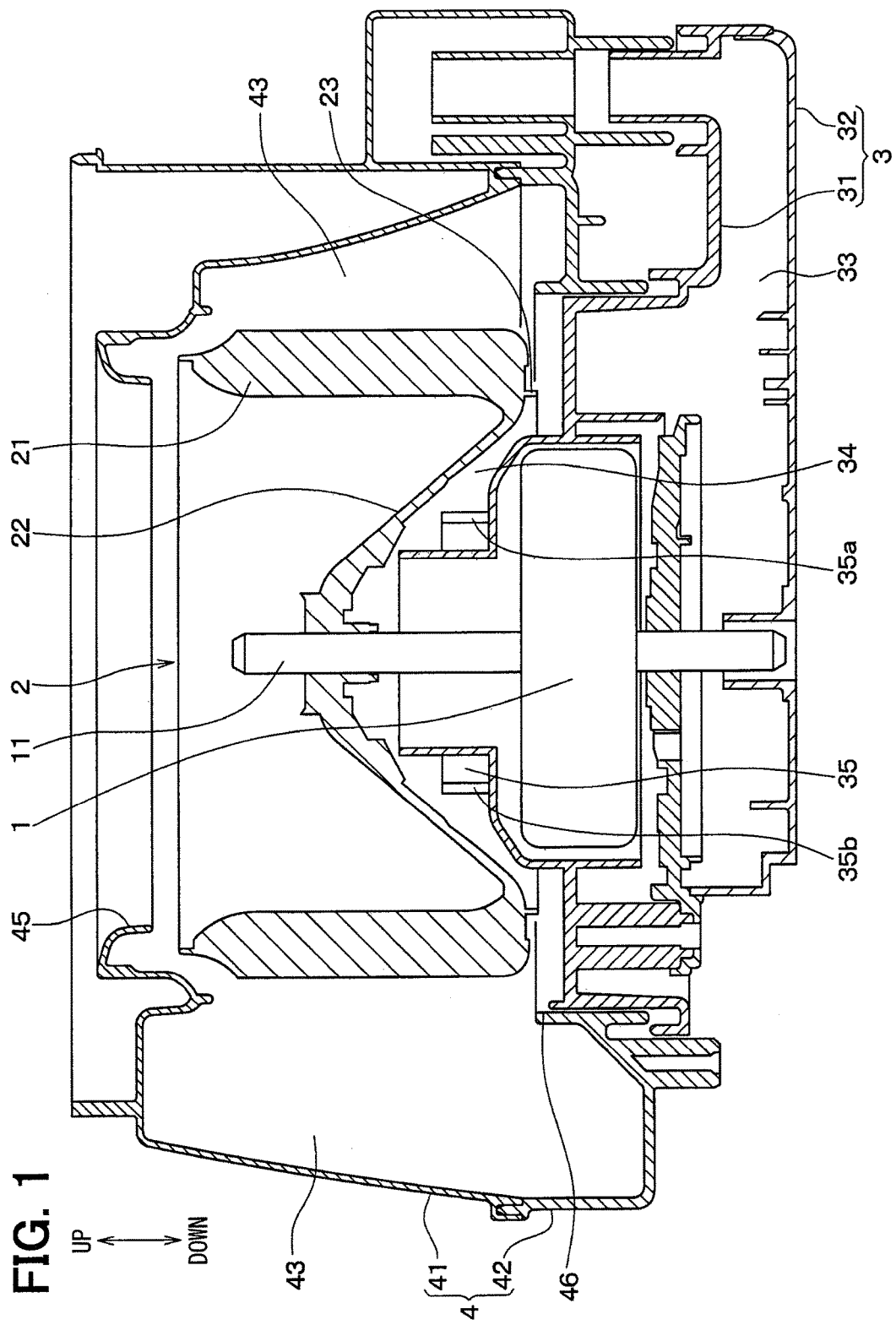
FIG. 1 is a front cross-sectional view illustrating a blower according to a first embodiment of the present disclosure.

Exemplary embodiments of the present disclosure will be described below with reference to the drawings. Throughout the disclosure, like reference numerals refer to like parts throughout the various drawings and embodiments of the present disclosure.

[First Embodiment]

A first embodiment of the present disclosure will be described.

Figure 2:
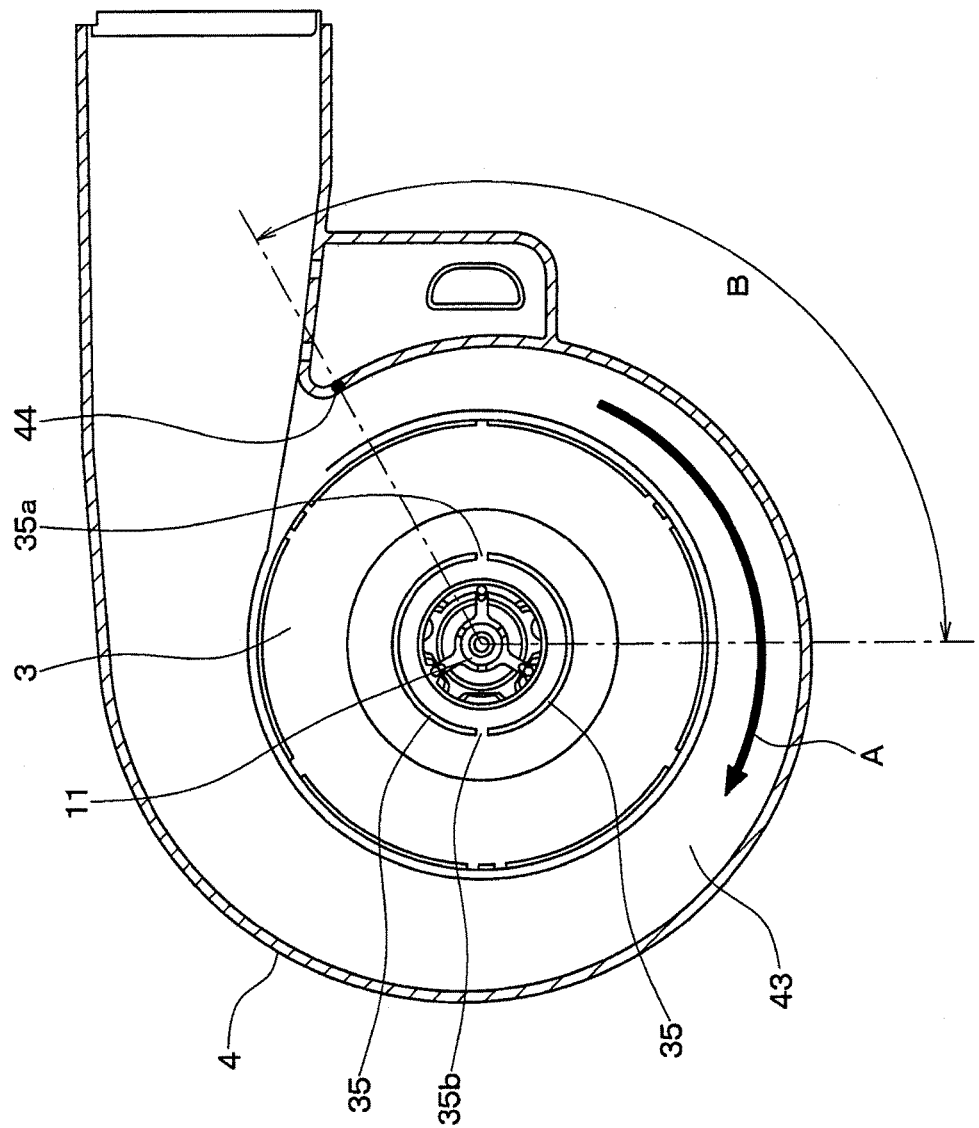
FIG. 2 is a top cross-sectional view illustrating a state in which a fan of the blower in FIG. 1 is removed.

As illustrated in FIGS. 1 and 2, a blower includes a motor 1, a fan 2 which is made of resin and is rotatably driven by the motor 1 to blow air, a motor casing 3 which is made of resin and accommodates the motor 1, and a scroll casing 4 which is made of resin and stores the fan 2. Hereinafter, the axial direction of a rotary shaft 11 of the motor 1 is referred to as a rotary shaft direction.

The fan 2 has a plurality of plate-shaped blades 21 arranged around the rotary shaft 11. The end portions of the blades 21 toward one side in the rotary shaft direction, namely toward a suction port 45 to be described later, are connected by an annular side shroud (not shown). In addition, the end portions of the blades 21 toward the other side in the rotary shaft direction are connected by a main shroud 22.

The main shroud 22 has a substantially conical shape, which is convex toward one side in the rotary shaft direction, namely toward the suction port 45. In addition, the main shroud 22 is coupled to the rotary shaft 11 at the center portion thereof, and transfers rotational driving force generated by the motor 1 to the blades 21.

The fan 2 is rotatably driven by the motor 1 so that air is drawn into the fan 2 from one side in the rotary shaft direction, and allows the drawn air to be blown radially outward from the fan.

The motor casing 3 is configured of a first motor casing 31 and a second motor casing 32. The motor casing 3 has a cooling air induction passage 33 therein such that a portion of ventilation air, which is motor-cooling air, is introduced into the motor 1 through the cooling air induction passage 33. In addition, a cooling air discharge passage 34, through which the motor-cooling air after passing through the inside of the motor 1 is returned to a scroll chamber 43 to be described later, is formed between the first motor casing 31 and the main shroud 22.

The scroll casing 4 is configured of a first scroll casing 41 and a second scroll casing 42. The scroll casing 4 has a spiral scroll chamber 43 formed around the fan 2. The scroll chamber 43 has a passage cross-sectional area, which is gradually enlarged from a winging start portion of the scroll chamber 43, namely a nose portion 44, to a winging end portion, such that air blown from the fan 2 is more effectively collected in the scroll chamber 43 and flows downstream. In addition, the air flow in the scroll chamber 43 is indicated by arrow A in FIG. 2.

The first scroll casing 41 has a suction port 45 formed toward one side in the rotary shaft direction to serve as an inlet of air drawn by the fan 2. The second scroll casing 42 has a through-hole 46 formed at a position facing the suction port 45, and the first motor casing 31 is fitted to the through-hole 46.

The main shroud 22 has a fan rib 23, which protrudes toward the cooling air discharge passage 34 and is formed at a surface facing the first motor casing 31. The fan rib 23 is annularly formed along a circumferential direction of the fan while extending in the rotary shaft direction.

The first motor casing 31 has a motor rib 35, which protrudes toward the cooling air discharge passage 34 and is formed on a surface facing the main shroud 22. The motor rib 35 is annularly formed along a circumferential direction of the fan while extending in the rotary shaft direction.

The motor rib 35 has a first notch portion 35a and a second notch portion 35b, through which inner peripheral and outer peripheral spaces of the motor rib 35 communicate with each other.

The first notch portion 35a is disposed in a portion near a high-pressure region B in the scroll chamber 43. In addition, the pressure in the scroll chamber 43 is gradually decreased from the winding start portion (i.e. the nose portion 44) to the winding end portion. Accordingly, the high-pressure region B is a predetermined range which is defined along the air flow A from the nose portion 44. In the embodiment, the high-pressure region B is a range of about 135° from the nose portion 44.

The second notch portion 35b is disposed in a low-pressure region other than the high-pressure region B. In more detail, the second notch portion 35b is disposed at a position of about 180° in the circumferential direction of the fan relative to the first notch portion 35a.

Although not illustrated, in a vehicle air conditioner, an inside and outside air switching box is connected upstream of the blower in the air flow direction, and an air conditioning unit is connected downstream of the blower in the air flow direction. The air conditioning unit includes an evaporator for cooling ventilation air, a heater core for heating ventilation air, a mode door for setting ventilation of ventilation air, etc., which are arranged therein. Air drawn by the fan 2 is transferred to the air conditioning unit through the scroll chamber 43, and is then blown toward each outlet, which is disposed at the most downstream side of the air flow, through the air conditioning unit.

In the blower having the above configuration, when the fan 2 is driven by the motor 1, air is transferred to the air conditioning unit through the scroll chamber 43, and at the same time a portion of ventilation air is introduced into the cooling air induction passage 33. The motor-cooling air introduced into the cooling air induction passage 33 cools the motor 1 when passing through the inside of the motor 1, and is then returned to the scroll chamber 43 through the cooling air discharge passage 34.

In addition, the motor rib 35 suppresses moisture such as rainwater and evaporator detergent from infiltrating into the motor 1 through the cooling air discharge passage 34. However, a portion of the moisture infiltrates into the inner peripheral space of the motor rib 35 across the motor rib 35.

That is, the flow velocity of ventilation air in the scroll chamber 43 is gradually increased from the winding start portion to the winding end portion. That is, the flow velocity of ventilation air in the scroll chamber 43 is low in the high-pressure region B in which the first notch portion 35a is disposed, whereas the flow velocity is high in the low-pressure region in which the second notch portion 35b is disposed.

A portion of the moisture such as rainwater and evaporator detergent flows into the scroll chamber 43, and then infiltrates into the inner peripheral space of the motor rib 35 across the motor rib 35 in the low-pressure region in which the flow velocity of ventilation air is high in the scroll chamber 43. In addition, a portion of the moisture infiltrates into the inner peripheral space of the motor rib 35 through the second notch portion 35b in the low-pressure region.

Since the first notch portion 35a is disposed in the portion facing the high-pressure region B in the scroll chamber 43, the moisture infiltrating into the inner peripheral space of the motor rib 35 is pressed to the first notch portion 35a by the ventilation air, infiltrating into the inner peripheral space of the motor rib 35 from the low-pressure region in the scroll chamber 43, so as to be discharged to the scroll chamber 43 from the first notch portion 35a.

According to the embodiment, since the moisture infiltrating into the inner peripheral space of the motor rib 35 is discharged to the scroll chamber 43, it is possible to prevent the components of the motor 1 from being corroded due to the infiltrated moisture.

In addition, moisture, which remains in the inner peripheral space of the motor rib 35 when the motor 1 is stopped, flows from the first notch portion 35a and the second notch portion 35b to the scroll chamber 43 by gravity.

Accordingly, when the rotary shaft direction is a non-vertical direction and the first notch portion 35a is disposed beneath the second notch portion 35b, the moisture flows from the first notch portion 35a to the scroll chamber 43 by gravity. Therefore, the second notch portion 35b may be removed.

[Second Embodiment]

A second embodiment of the present disclosure will be described. Hereinafter, only portions different from those in the first embodiment will be described.

Figure 3:
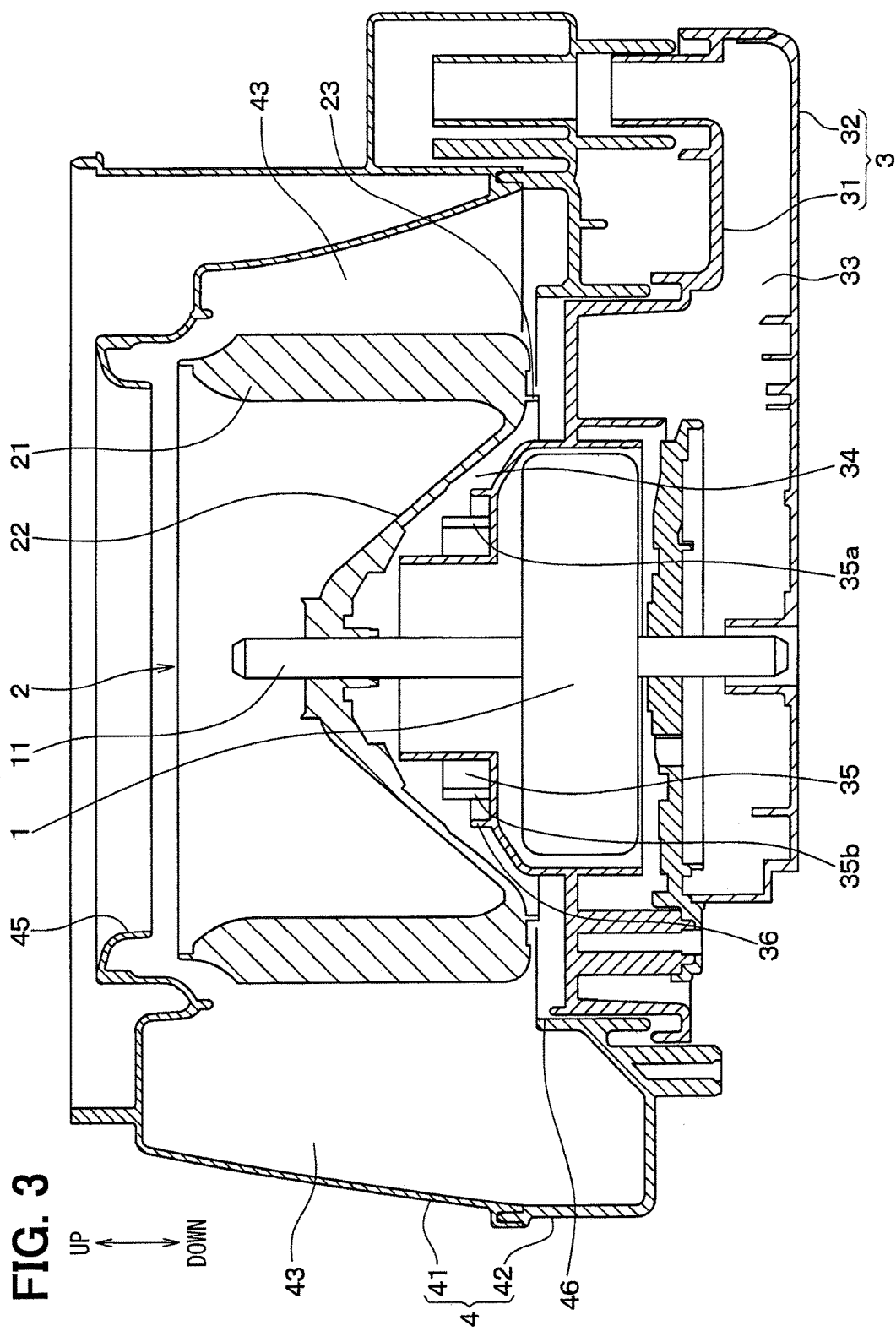
FIG. 3 is a front cross-sectional view illustrating a blower according to a second embodiment of the present disclosure.
Figure 4:
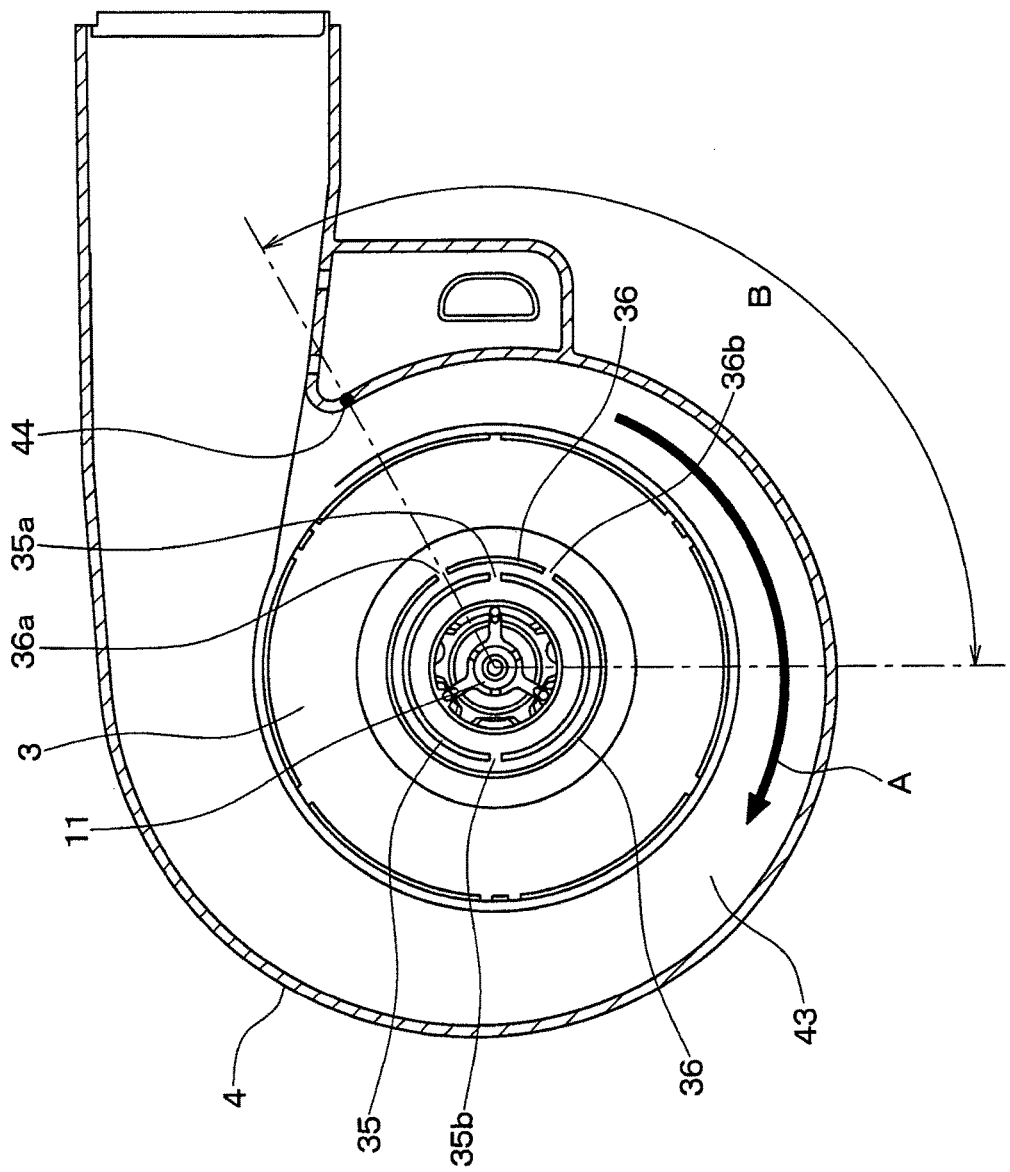
FIG. 4 is a top cross-sectional view illustrating a state in which a fan of the blower in FIG. 3 is removed.

As illustrated in FIGS. 3 and 4, the first motor casing 31 has a second motor rib 36, which is formed in a concentric form with the motor rib 35 and to the outer peripheral side of the motor rib 35.

The second motor rib 36 protrudes toward the cooling air discharge passage 34, and at the same time is formed on a surface facing the main shroud 22. In addition, the second motor rib 36 extends in the rotary shaft direction and is annularly formed along the circumferential direction of the fan.

The second motor rib 36 has a first outside notch portion 36a and a second outside notch portion 36b, through which inner peripheral and outer peripheral spaces of the second motor rib 36 communicate with each other.

The first outside notch portion 36a is disposed upstream of the first notch portion 35a in the air flow direction A. In more detail, the first outside notch portion 36a is disposed within a range of about 90° in the circumferential direction of the fan relative to the first notch portion 35a.

The second outside notch portion 36b is disposed downstream of the first notch portion 35a in the air flow direction A. In more detail, the second outside notch portion 36b is disposed within a range of about 90° in the circumferential direction of the fan relative to the first notch portion 35a.

In addition, at least the second outside notch portion 36b of the first and second outside notch portions 36a and 36b is disposed in a portion facing the high-pressure region B in the scroll chamber 43.

A portion of moisture such as rainwater and evaporator detergent flows into the scroll chamber 43, and then infiltrates into the inner peripheral space of the second motor rib 36 across the second motor rib 36 in the low-pressure region in which the flow velocity of ventilation air is high in the scroll chamber 43.

Here, since the second outside notch portion 36b is disposed at the portion near the high-pressure region B in the scroll chamber 43, the moisture infiltrating into the inner peripheral space of the second motor rib 36 is pressed to the second outside notch portion 36b by the ventilation air, infiltrating into the inner peripheral space of the second motor rib 36 from the low-pressure region in the scroll chamber 43, so as to be discharged to the scroll chamber 43 from the second outside notch portion 36b.

In addition, a portion of the moisture infiltrating into the inner peripheral space of the second motor rib 36 infiltrates into the inner peripheral space of the motor rib 35 across the motor rib 35. Furthermore, a portion of the moisture infiltrates into the inner peripheral space of the motor rib 35 through the second notch portion 35b in the low-pressure region.

The moisture infiltrating into the inner peripheral space of the motor rib 35 is pressed to the first notch portion 35a by the ventilation air, infiltrating into the inner peripheral space of the motor rib 35 from the low-pressure region in the scroll chamber 43, and is then discharged to the inner peripheral space of the second motor rib 36 from the first notch portion 35a. Moreover, the moisture discharged to the inner peripheral space of the second motor rib 36 is pressed to the second outside notch portion 36b by the ventilation air, infiltrating into the inner peripheral space of the second motor rib 36, so as to be discharged to the scroll chamber 43 from the second outside notch portion 36b.

According to the embodiment, the same effects as the first embodiment can be obtained.

In addition, since the embodiment is provided with the motor rib 35 and the second motor rib 36, it is possible to more securely suppress the moisture such as rainwater and evaporator detergent from infiltrating into the motor 1 through the cooling air discharge passage 34.

Furthermore, the moisture can be more securely suppressed from infiltrating into the motor 1 through the cooling air discharge passage 34, thereby enabling the height of the motor rib 35 and the second motor rib 36 to be controlled to the minimum level. Consequently, the flow of motor-cooling air cannot be disturbed.

In addition, two first notch portions 35a may be disposed in the portion near the high-pressure region B in the scroll chamber 43, and thus one of the first and second outside notch portions 36a and 36b may also be removed.

Moreover, three or more notch portions may be provided in the motor rib 35, and three or more notch portions may be provided in the second motor rib 36.

[Other Embodiments]

The present disclosure is not limited to the above-mentioned embodiments, and can be properly modified within the spirit and scope of the present disclosure defined in the appended claims.

In addition, the above respective embodiments are related with each other, and can be properly combined except for the case where the combination thereof is unclear.

In the above respective embodiments, it should be noted that the components constituting the embodiments are not necessarily required except as clearly specified to be necessary and as considered to be obviously necessary in principle.

In the above respective embodiments, the numerical values such as the number, values, quantities, and ranges of components that are mentioned in the embodiments are not limited to a specific number except as clearly specified to be necessary and as considered to be obviously necessary in principle.

In the above respective embodiments, the shapes and positional relationships of components that are mentioned in the embodiments are not limited to a specific shape and positional relationship except as clearly specified to be necessary and as considered to be obviously necessary in principle.

What is claimed is:

1. A blower comprising:
a motor;
a fan having a plurality of blades arranged around a rotary shaft of the motor, and a main shroud transferring rotational driving force generated by the motor to the blades while connecting the blades, the fan drawing air from one side in an axial direction so that the air is blown radially outward from the fan;
a scroll casing having a spiral scroll chamber formed around the fan while accommodating the fan; and
a motor casing accommodating the motor, and arranged to face the main shroud, wherein
the main shroud includes a fan rib, disposed at a surface facing the motor casing and protruding toward the motor casing while being annularly formed along a circumferential direction of the fan;
the motor casing includes a motor rib, disposed at a surface facing the main shroud and protruding toward the main shroud while being annularly formed along a circumferential direction of the fan;
the motor rib includes a notch portion, through which an inner peripheral space and an outer peripheral space of the motor rib communicate with each other, at a portion approaching a high-pressure region in the spiral scroll chamber;
the motor rib includes an inner peripheral rib, an outer peripheral rib and an annular chamber formed therebetween; and
the notch portion includes at least an inner peripheral notch portion provided in the inner peripheral rib and an outer peripheral notch portion provided in the outer peripheral rib.

2. The blower according to claim 1, wherein
the outer peripheral notch portion is arranged downstream of the inner peripheral notch portion in an air flow direction of the spiral scroll chamber.

3. The blower according to claim 1, wherein
the outer peripheral rib has an annular shape extending in the circumferential direction and surrounding a radially outside of the inner peripheral rib, and
the outer peripheral notch portion is provided in the high-pressure region.

4. The blower according to claim 1, wherein
the inner peripheral notch portion and the outer peripheral notch portion are provided in the high-pressure region, and
the high-pressure region is within a range of 0 degrees to 135 degrees extending from a nose portion of the scroll casing in an air flow direction in the spiral scroll chamber.

5. The blower according to claim 1, wherein
the inner peripheral notch portion and the outer peripheral notch portion are circumferentially misaligned from each other.

6. The blower according to claim 1, wherein
the inner peripheral notch portion includes two inner peripheral notch portions located diametrically opposed from each other.

7. The blower according to claim 1, wherein
the inner peripheral notch portion includes two inner peripheral notch portions spaced 180 degrees apart from each other.

* * * * *